US009319089B1

(12) United States Patent
Burnett et al.

(10) Patent No.: US 9,319,089 B1
(45) Date of Patent: Apr. 19, 2016

(54) APPARATUS FOR INTERFACING AUXILIARY DEVICES WITH RADIO COMMUNICATION HARDWARE

(71) Applicant: The United States of America, as represented by the Secretary of the Air Force, Washington, DC (US)

(72) Inventors: Gregory M. Burnett, Dayton, OH (US); Peter Voland, Fairborn, OH (US); Matthew Stechschulte, Fairborn, OH (US)

(73) Assignee: The United States of America as requested by the Secretary of the Air Force, Washington, DC (US)

( * ) Notice: Subject to any disclaimer, the term of this patent is extended or adjusted under 35 U.S.C. 154(b) by 97 days.

(21) Appl. No.: 14/187,378

(22) Filed: Feb. 24, 2014

(51) Int. Cl.
*H04B 1/38* (2015.01)
*H04B 1/40* (2015.01)
*H01R 13/66* (2006.01)

(52) U.S. Cl.
CPC . *H04B 1/40* (2013.01); *H01R 13/66* (2013.01)

(58) Field of Classification Search
CPC .................. H01L 2924/0002; H01L 2924/00; H01L 2225/06513; H01L 2225/06534; H01L 23/48; H01L 25/0657; H01L 2924/3011; H01L 31/035236; H01L 31/06; H01L 31/101; G06F 1/3209; G06F 13/4045; G06F 13/409; G06F 21/00; H01Q 19/10; H01Q 1/007; H01Q 1/38; H01Q 1/521; H01Q 1/526; H01Q 21/24; H01Q 5/50; H01Q 9/0407
See application file for complete search history.

(56) References Cited

U.S. PATENT DOCUMENTS

| | | | | |
|---|---|---|---|---|
| 2007/0004464 | A1 * | 1/2007 | Lair .................... | H04M 1/6066 455/569.1 |
| 2010/0081337 | A1 * | 4/2010 | Dorogusker ......... | H01R 31/065 439/660 |
| 2013/0093240 | A1 * | 4/2013 | Lin ....................... | H02J 7/0042 307/11 |
| 2013/0238823 | A1 * | 9/2013 | Terlizzi ................. | G06F 13/102 710/62 |

OTHER PUBLICATIONS

Motorola Corporation, Motorola Two-Way Portable and Mobile Radio Accessory and Battery Catalog, 2006.

* cited by examiner

*Primary Examiner* — Golam Sorowar
(74) *Attorney, Agent, or Firm* — AFMCLO/JAZ; Jason Sopko

(57) ABSTRACT

An apparatus for interconnecting a radio communication equipment connector with non-Original Equipment Manufacturer (OEM) accessories includes a pass through portion including a first connector and a second connector having the same type and an opposing gender with respect to the first connector. A conversion portion is coupled adjacent the pass through portion and is configured to electrically interface with one of the plurality of the contacts of the first connector or the second connector. The conversion portion is further configured to transmit a signal from one of the plurality of contacts of the first connector or the second connector to a non-OEM accessory. Additionally, the apparatus is configured to concurrently maintain the functionality between an OEM accessory and a radio connected thereto.

4 Claims, 3 Drawing Sheets

APPARATUS FOR INTERFACING AUXILIARY DEVICES WITH RADIO COMMUNICATION HARDWARE

RIGHTS OF THE GOVERNMENT

The invention described herein may be manufactured and used by or for the Government of the United States for all governmental purposes without the payment of any royalty.

FIELD OF THE INVENTION

The present invention relates generally to radio communication equipment, and more specifically, to apparatus and methods of interfacing auxiliary devices with radio communication hardware.

BACKGROUND OF THE INVENTION

In the field of radio communication hardware (often simply referred to as "radios"), there exists a wide variety of equipment configurations and operating environments. Radios may be hand held, man-portable, vehicle mounted, base station, or the like, and operating environments span the gamut from high-tempo tactical military operations to more mundane facilitation of communication between janitorial staff members. In the discussion that follows, particular reference will be made to military and law enforcement-centric scenarios. However, each of the problems and solutions encountered in the military and law enforcement environments will have analogous applicability in other fields as well.

Most hand held radios are capable of functioning without the use of external speakers, microphones, Push to Talk (PTT) switches, or the like. Traditionally, each of those elements is contained within the housing of the hand held radio, and no external components are required to operate the device. However, many manufacturers use a proprietary or standardized auxiliary port, having an auxiliary connector, to electrically couple brand specific or purpose specific hardware to the radio. This brand specific or purpose specific accessory may be referred to as an "OEM accessory." For example, a standalone hand-held radio may use an auxiliary port to connect a wired microphone, speaker, and PTT package (often referred to as a "shoulder mic"). This allows the handheld radio to be stowed on the belt of the user, while placing the wired remote speaker, microphone, and PTT on the user's lapel or upper chest. While this provides a degree of added flexibility for the user, he is limited to using OEM accessories designated by the manufacturer (or devices from other manufactures that mate with OEM auxiliary connectors) for use with the radio and auxiliary port.

It is often desirable to use non-OEM accessories with the radio. For example, it may be useful to interface the radio with commercially available recording equipment by use of an XLR connector. Also, in covert environments, it may be desirable to monitor radio traffic by stowing the radio in a backpack and using generic headphones originally designed for use with portable mp3 players. The use of consumer electronic accessories may draw less attention than the use of military specific hardware.

Unfortunately, even if the connector of the non-traditional accessory is modified to interface with the auxiliary port, existing OEM accessories would be rendered inoperative (since the radio's auxiliary connector would be occupied by the modified non-traditional accessory). Moreover, the non-OEM accessory's functionally would be limited because it would no longer be suitable for its original use (e.g., converting a set of ear buds to interface with an auxiliary connector would render them unusable for use with an mp3 player).

In vehicle mounted or base station implementations, the user's microphone and PTT (and occasionally, the speaker), are located external to the radio housing. A table top microphone with PTT, a pendant similar to a shoulder mic, or a telephone handset style transceiver is connected to the radio chassis with a suitable connector. Therefore, in addition to the difficulties experienced when attempting to interface non-traditional devices to a hand held radio, in a vehicle mounted configuration the functionality of the radio is impaired unless a non-OEM accessory includes the same features as the OEM accessory it replaces. For example, connecting modified ear buds to the auxiliary port would enable a user to monitor traffic, but transmitting audio would be impossible in the absence of a microphone or PTT. Likewise, if a recording interface (XLR, RCA, etc.) is connected to the auxiliary port, the same functionality is lost. Therefore, there exists a need for improved connectivity between non-OEM accessories and radios.

A capability to record audio is often highly desirable, even though many radios (particularly hand held models) do not have a native means of enabling such recording. During high stress operations, an accurate account of all radio traffic may be invaluable for reconstructing timelines of events and for post-mission debriefing. While console mounted base station radios may offer the ability to record audio, many military forces may operate in ad-hoc radio networks that are too distant to make contact with a base station. Additionally, audio may be intelligible between team members on the ground, yet may be garbled by interference as audio reaches remotely located recording equipment. As a result, improved methods and apparatus for audio recording are required.

Another limitation of OEM radio accessories is encountered by light and agile forward operating units. Traditionally, each member of a team would be required to carry and operate his own radio. This adds additional equipment weight, as well as battery requirements, to each member of the team. In a hardwired accessory regime, an OEM shoulder mic (or hardwired voice activated kit) merely allows a user to relocate the weight and mass of his radio, not eliminate it. However, under most operating conditions, acceptable results would be achieved if a single radio was carried by a member of the team, and team members were able to interface headsets and other devices wirelessly with another team member's radio. Therefore, users would benefit from an improved apparatus and method for distributed utilization of communal radio resources.

Despite the current advances in radio communication technology, there remains a need for apparatus and methods of interfacing radios with non-OEM accessories, recording devices, and wireless devices.

SUMMARY OF THE INVENTION

The present invention overcomes the foregoing problems and other shortcomings, drawbacks, and challenges of interfacing auxiliary devices with radio communication hardware. While the invention will be described in connection with certain embodiments, it will be understood that the invention is not limited to these embodiments. To the contrary, this invention includes all alternatives, modifications, and equivalents as may be included within the spirit and scope of the present invention.

In one embodiment of the disclosed invention, an apparatus for interconnecting a radio communication equipment connector with non-Original Equipment Manufacturer (OEM)

accessories is provided. The apparatus includes a pass through portion including a first connector and a second connector having the same type and an opposing gender with respect to the first connector. The first connector and the second connector have a plurality of contacts, and the first connector and the second connector are interconnected so that electrical continuity is maintained between the plurality of contacts of the first connector and the plurality of corresponding contacts of the second connector. A conversion portion is coupled adjacent the pass through portion and is configured to electrically interface with one of the plurality of the contacts of the first connector or the second connector. The conversion portion is further configured to transmit a signal from one of the plurality of contacts of the first connector or the second connector to a non-OEM accessory. Additionally, the apparatus is configured to concurrently maintain the functionality between an OEM accessory and a radio connected thereto.

In another embodiment of the disclosed invention, a method for sharing communication hardware resources among users is provided. The method includes providing a communal radio transceiver having a first output power and electrically coupling a wireless module to an analog to digital converter and to a digital to analog converter. The method also includes electrically coupling the analog to digital converter and the digital to analog converter to an auxiliary port of the communal radio transceiver. The method further includes configuring the wireless module to pair with two or more wireless devices. The method also includes sending signals from the wireless devices to the wireless module using a second output power that is less than the first output power, and using the communal radio to transmit the signals received by the wireless module.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
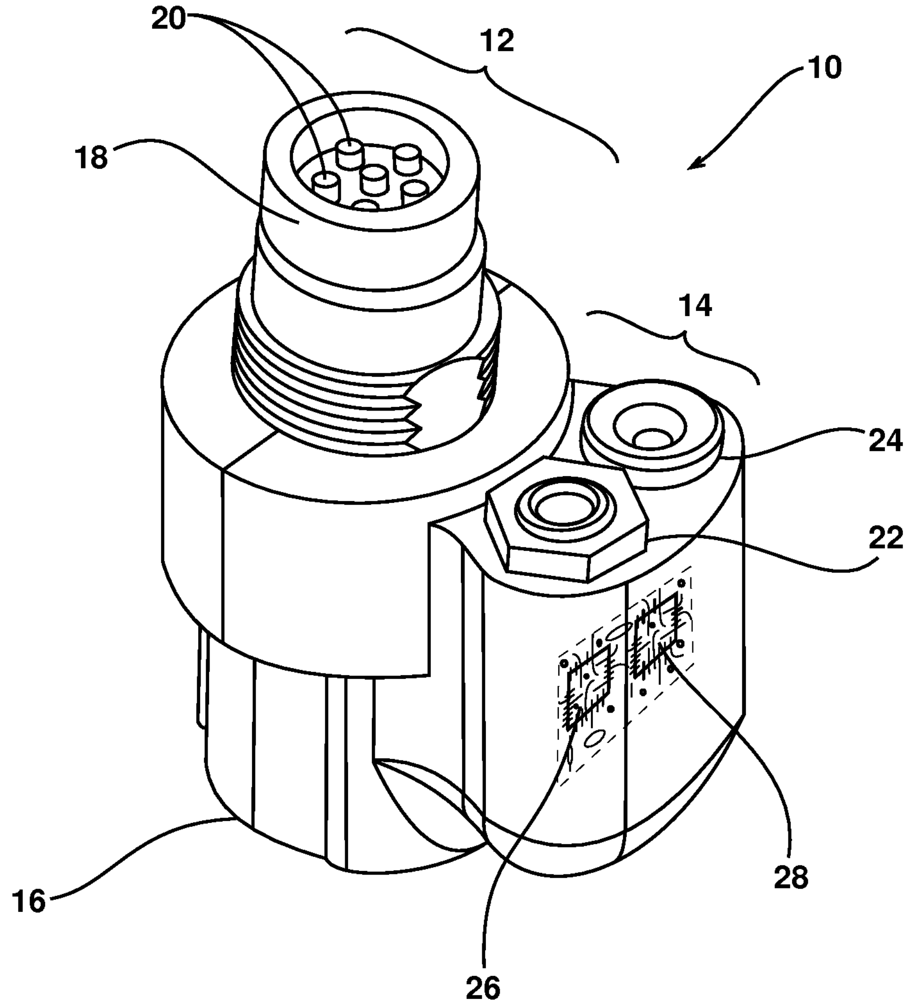
FIG. 1 is a perspective view of one embodiment of the disclosed invention, which includes one or more jacks.

Turning now to the figures, and in particular to FIG. 1, a perspective view of the radio interface 10 is shown. The radio interface 10 includes a pass through portion 12 and a conversion portion 14. In each of the embodiments that follows, the pass through portion 12 is interconnected adjacent the conversion portion 14 without the use of external cables that could snag during rigorous use. The pass through portion 12 includes a first connector 16 and a second connector 18. The first connector 16 and second connector 18 may be configured to use the same connector type with opposing connector genders. For example, as shown in FIG. 1, second connector 18 is a male U-328 type connector, and first connector 16 is a female U-329 type connector. The gender and connection type are selected to electrically and mechanically cooperate with the desired connector of the host radio. For example, many radios use a bulkhead mounted male U-328 type connector, so the first connector 16 is configured as a female U-329 fitting. With an appropriately selected first connector 16, the radio interface 10 may then be electrically and mechanically mated to the radio. As shown here, the female U-329 first connector 16 would mate with a male U-328 connector on the radio. As will be recognized by one of ordinary skill in the art, the first connector 16 and second connector 18 may be varied to accommodate a variety of radio and accessory configurations. By way of example and not limitation, the first connector 16 and second connector 18 may also be U-329, U-328, U-228, U-229, Motorola® 16 pin, Motorola® 13 pin, Kenwood® style, RJ45, modular plug, bayonet, or other electrical connectors used to interconnect accessories to radios.

The pass through portion 12 is further configured to enable existing OEM accessories to function properly when connected to the radio interface 10. For example, an existing telephone handset style transceiver terminated with a cable and female U-329 connector would be traditionally terminated to a bulkhead mounted male U-328 connector of a radio. If the female connector of the handset cable is decoupled from the radio, the first connector 16 of the radio interface 10 may be mated to the radio. The female connector of the handset may then be coupled to the second connector 18 of the radio interface 10. Each of the contacts 20 of the second connector 18 is electrically connected to the corresponding pin 20 on the first connector 16. In this way, electrical continuity is maintained between each pin of the radio connector and handset connection when then radio interface 10 is disposed therebetween. As a result, the full functionality of the handset (or other OEM accessory) is maintained regardless of the configuration of the conversion portion 14 (explained in greater detail below).

The conversion portion 14 may be configured to translate the signals passing through the contacts 20 of the radio interface 10 into a format compatible with non-OEM accessories, an internal recording device, or remote wireless devices. In each configuration, the radio interface 10 concurrently accomplishes the conversion while maintaining full functionality of an OEM accessory connected to the radio through the radio interface 10. Moreover, the conversion is accomplished by the radio interface 10 without using cords or other extraneous modules that could impair agile motion of an active user.

In one embodiment of the present invention, the conversion portion 14 of the radio interface 10 includes a first jack 22 and a second jack 24. The first jack 22 may be an audio connector wired in parallel to the contacts 20 of the first connector 16 and second connector 18 that correspond to the speaker function of the radio. In one embodiment of the invention, the first jack 22 may be a ⅛" phonograph jack, 3.5 mm phonograph jack, 2.5 mm phonograph jack, NEXUS®, coaxial, optical, or other suitable connector.

In another embodiment of the present invention, the first jack 22 may be a Universal Serial Bus (USB) jack (or other high speed serial protocol or high speed serial jack known to one of ordinary skill in the art, to include Firewire®, mini display port connector/Thunderbolt®, etc.), and the conversion portion 14 may include an analog to digital converter 26 and a USB encoder 28. The analog to digital converter 26 is electrically coupled to the contacts 20 of the first connector 16 and second connector 18 that correspond to the speaker and microphone functions of the radio. The USB encoder 28 receives the digital output from the analog to digital converter 26 and converts the data into a USB compliant bit stream available to the USB first jack 22. In this way, the analog content from the radio speaker and microphone may be streamed to an external device via the USB first jack 22. As will be recognized by one of ordinary skill in the art, a digital to analog converter or additional circuitry to appropriately adjust line levels, polarity, signal formats, etc., may be installed between the contacts 20 of the first connector 16 or the second connector 18 and the first jack 22 as dictated by the requirements of the non-OEM accessory.

The second jack 24 may be electrically coupled to the contacts 20 of the first connector 16 and second connector 18 corresponding to the PTT function of the radio. An external PTT switch may be plugged into the second jack 24, thereby enabling a user to activate the PTT function from a remote location.

Figure 2:
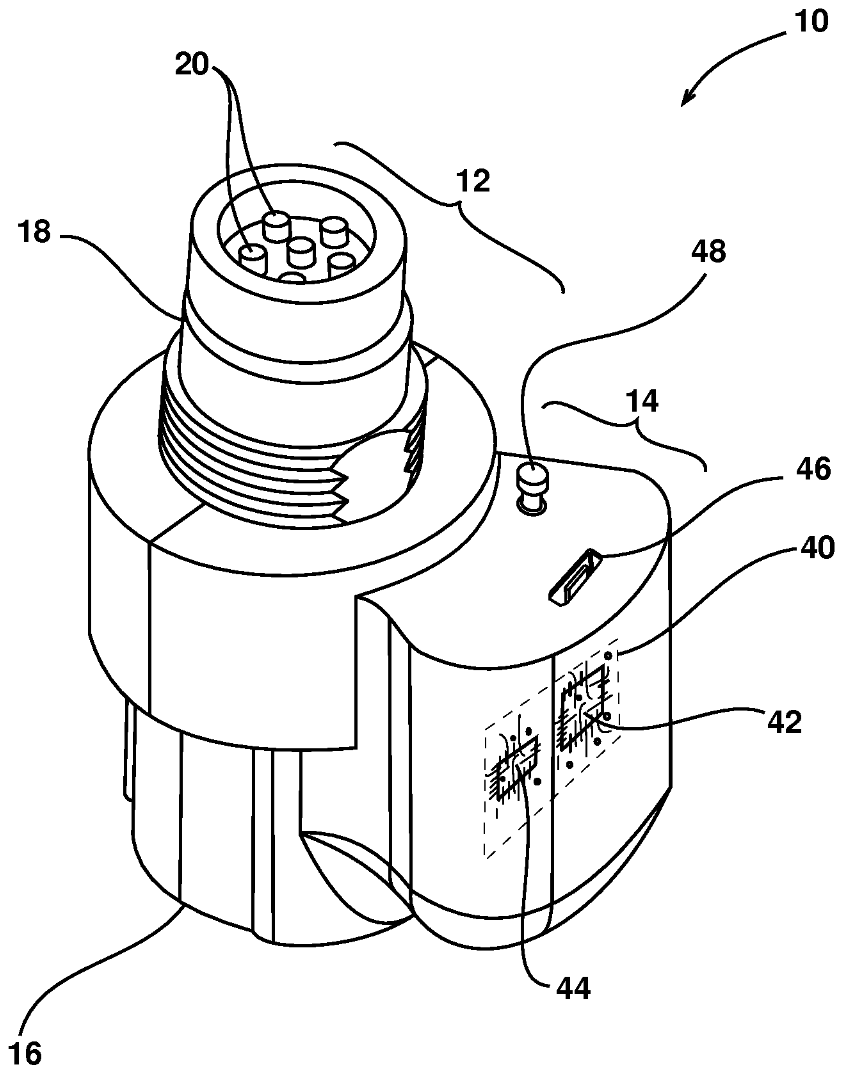
FIG. 2 is a perspective view of one embodiment of the disclosed invention, which includes an audio capture module.

Turning attention to FIG. 2, the same elements of the pass through portion 12 are present in a second embodiment of the disclosed invention. However, in this embodiment the conversion portion 14 has been configured with an audio capture module 40. The audio capture module 40 may obtain sufficient power from the appropriate contact 20 of the radio, and an onboard battery may be omitted. The audio capture module 40 may include a microcontroller 42 configured to receive signals associated with the microphone and speaker functions of the radio (via the corresponding contacts 20). The signals are converted from analog to digital format, and the microcontroller 42 encodes the bit stream into a suitable audio file. The selected audio file format may be MP3, WAV, WMA, or any other format that provides an acceptable balance between sound quality and storage consumption. Once encoded, the data is written to a non-volatile memory 44 for subsequent retrieval. Contents of the memory 44 may be extracted by downloading audio files via a micro USB jack 46 or other suitable wired digital interface, or they may be transferred wirelessly using Wi-Fi, Bluetooth, Near Field, or other suitable protocol known to one of ordinary skill in the art.

In some embodiments of the invention, an internal clock of the microcontroller 42 embeds timestamp data into the audio file so that subsequent review may reveal an accurate timeline of events recorded by the audio capture module 40. In one embodiment of the invention, the audio capture module 40 is configured in a passive mode to continuously record all transmitted and received audio, in addition to dead air time. This configuration is akin to recording events on an analog tape deck. By way of example, 5 minutes of received audio, 1 minute of transmitted audio, and 54 minutes of dead air will yield a one hour recording. In the alternative, the audio capture module 40 may be configured in an active mode. In this embodiment, only active audio is recorded and time stamped. Dead air is omitted, and the use of the memory 44 is reduced.

In some embodiments of the invention, the memory is utilized in a cyclical fashion, and upon reaching the maximum storage capacity of the memory 44, new audio overwrites the oldest audio saved to the memory 44. In other embodiments, recording terminates when the memory 44 is fully exhausted.

Additionally, the radio interface 10 may include a user interface 48 that allows an operator to play back audio on demand. The user interface 48 may be in the form of a pushbutton configured to play back a predetermined interval of audio with each depression of the button. For example, pressing the button of the user interface 48 four times may play back the most recent 20 seconds of audio. In the alternative, tapping the PTT in a predetermined pattern may invoke the playback mode. In doing so, the re-transmission may be played on the local radio speaker (or accessory speaker), and others utilizing the radio network need not be bothered with hearing the re-transmission. Moreover, use of the user interface 48 to replay audio reduces radio battery consumption and reduces one's RF signature.

In one embodiment of the invention, the radio interface 10 is configured to allow a user to securely delete, or zeroize, the contents of the memory 44. In the event that a user anticipates that the radio interface 10 may fall into enemy hands (or for the purpose of sanitizing the device upon being taken out of service), the user may activate a feature to irreversibly delete any previously recorded audio. This may be accomplished by purging a cryptographic key used to encode the data, overwriting the data with random characters, electrically or physically damaging the memory 44, or other techniques known to one of ordinary skill in the art. This feature may be activated by an additional button or switch, manipulation of the user interface 48 in a predetermined way, remotely received signal, or the like.

Figure 3:
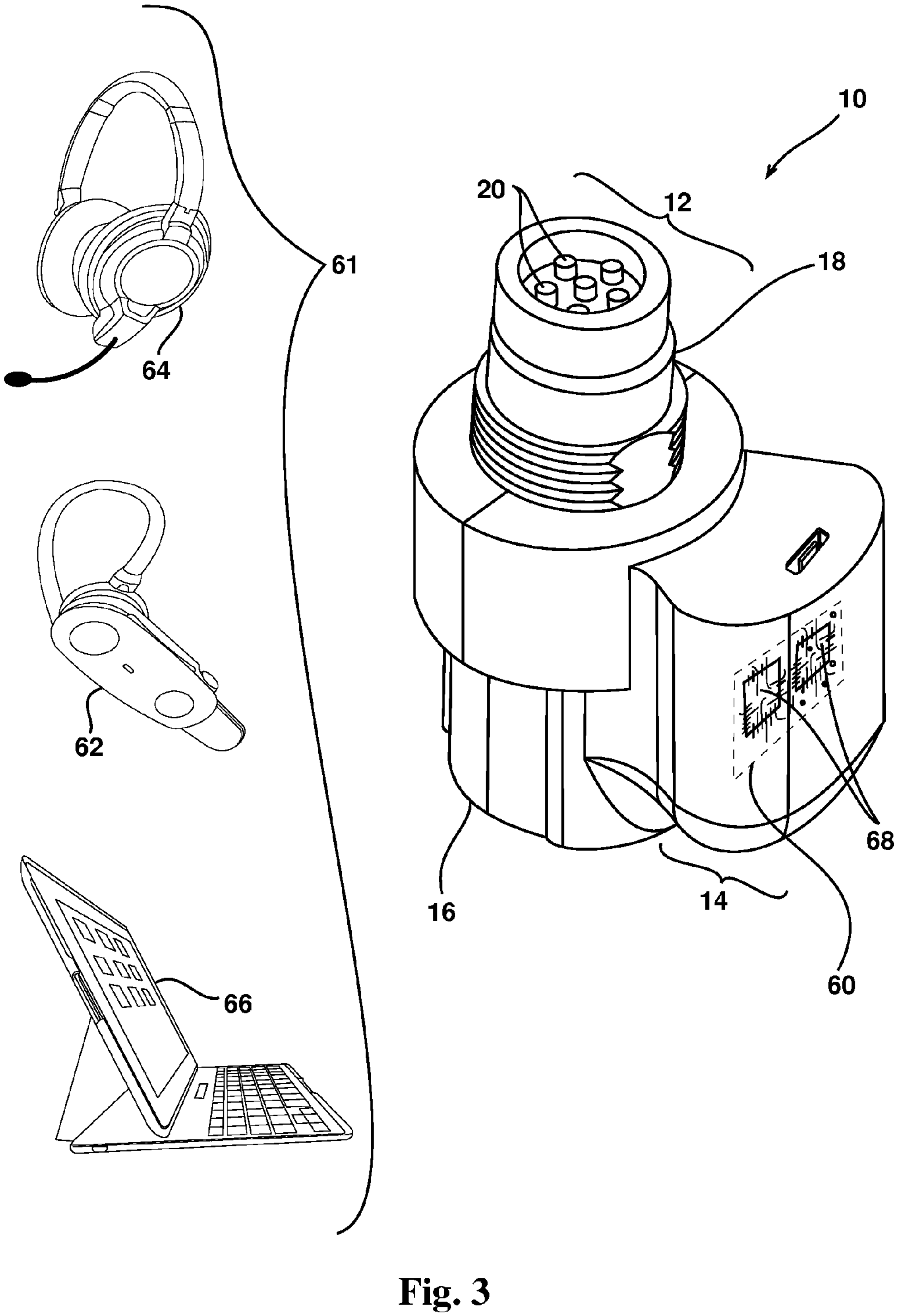
FIG. 3 is a perspective view of one embodiment of the disclosed invention, which includes a wireless module and a plurality of wireless devices.

Turning attention to FIG. 3, an additional embodiment of the radio interface 10 is shown. The conversion portion 14 includes a wireless module 60 powered by the appropriate contact 20 of the radio and is configured to interface a plurality of wireless devices 61 to a single radio. As before, the pass through portion 12 allows an OEM accessory to be used in conjunction with the radio interface 10. However, as is the case with each of the previous embodiments, the radio interface 10 may omit connection to accessories if desired. The wireless module 60 of the radio interface 10 may serve as a transceiver configured in Wi-Fi, Bluetooth, Near Field, ZigBee, optical, or other suitable wireless formats. These wireless protocols may be implemented at relatively low power (less than the output power of a radio connected thereto). A plurality of wireless devices 61, to include an earpiece 62, headset 64, data terminal 66, or other suitable wireless device may be paired with the wireless module 60.

The wireless module 60 allows the wireless devices 61 to use a communal radio (or set of radios) to send and receive audio and data. When interfacing with an auxiliary connector configured to send and receive analog signals, an analog to digital and digital to analog converter 68 may be used with the wireless module 60. In use, the wireless devices 61 are first paired, or authenticated, with respect to the wireless module 60. Paired devices are permitted to interact with the wireless module 60, and unauthorized (unpaired) devices are rejected by the wireless module 60. Additionally, transmission between the wireless devices 61 and the wireless module 60 may be encrypted using methods known to one of ordinary skill in the art.

In one embodiment of the disclosed invention, a plurality of radios having different frequencies and varied configurations may use radio interfaces 10 and wireless modules 60 to allow users to send and receive audio to and from dissimilar radio networks. For example, a user may receive messages to his earpiece 62 that have been relayed from both an encrypted military band radio, as well as an unencrypted channel used by civilian disaster response agencies. Additionally, the radio interface 10 and wireless module 60 may be configured to interface with the data port of a radio. A plurality of data terminals 66 may then wirelessly access the data channel of the host radio. Further, the wireless module 60 may enable a supervisor to monitor radio traffic of a trainee or subordinate by way of an appropriately paired earpiece 62 or other wireless device 61.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus for interconnecting a radio communication equipment connector with non-Original Equipment Manufacturer (OEM) accessories, the apparatus comprising:

a pass through portion including a first connector and a second connector having a same type and an opposing gender with respect to the first connector, wherein the first connector and the second connector have a plurality of contacts, and wherein the first connector and the second connector are interconnected so that electrical continuity is maintained between the plurality of contacts of the first connector and the plurality of corresponding contacts of the second connector;

a conversion portion coupled adjacent the pass through portion and configured to electrically interface with one of the plurality of the contacts of the first connector or the second connector, wherein the conversion portion is further configured to transmit a signal from one of the plurality of contacts of the first connector or the second connector to a non-OEM accessory;

wherein the apparatus is configured to concurrently maintain the functionality between an OEM accessory and a radio connected thereto; and wherein the conversion portion includes an audio capture module including a microcontroller electrically coupled to one of the plurality of contacts of the first connector or the second connector, and a memory electrically coupled to the microcontroller, wherein the microcontroller is configured to receive an analog audio signal from the first connector or the second connector, and wherein the microcontroller is further configured to convert the analog audio signal to a digital audio file and to store the digital audio file in the memory.

2. The apparatus of claim 1, wherein the conversion portion further includes a serial bus jack electrically coupled to the microcontroller, and wherein the microcontroller is configured to transfer a digital audio file from the memory to the serial bus jack.

3. The apparatus of claim 1, wherein the conversion portion further includes a wireless transceiver electrically coupled to the microcontroller, and wherein the microcontroller is configured to transfer a digital audio file from the memory to the wireless transceiver.

4. The apparatus of claim 1, wherein the conversion portion further includes a user interface electrically coupled to the microcontroller, and wherein the microcontroller is configured to play back a portion of a stored digital file to a speaker of a connected radio or a speaker of a connected accessory, in response to actuation of the user interface.

* * * * *